US010189293B2

(12) United States Patent
Ochiai et al.

(10) Patent No.: US 10,189,293 B2
(45) Date of Patent: Jan. 29, 2019

(54) ANTI-COUNTERFEIT MEDIUM AND VERIFICATION METHOD

(71) Applicant: TOPPAN PRINTING CO., LTD., Tokyo (JP)

(72) Inventors: Hideki Ochiai, Tokyo (JP); Mihoko Nagayoshi, Tokyo (JP); Kota Aono, Tokyo (JP); Yuki Kotegawa, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 1125 days.

(21) Appl. No.: 14/012,651

(22) Filed: Aug. 28, 2013

(65) Prior Publication Data

US 2013/0341903 A1 Dec. 26, 2013

Related U.S. Application Data

(63) Continuation of application No. PCT/JP2012/054785, filed on Feb. 27, 2012.

(30) Foreign Application Priority Data

Feb. 28, 2011 (JP) ................................. 2011-041609

(51) Int. Cl.
*B42D 25/364* (2014.01)
*B42D 25/45* (2014.01)
*B41M 3/14* (2006.01)
*G02B 5/30* (2006.01)
(Continued)

(52) U.S. Cl.
CPC .............. *B42D 25/364* (2014.10); *B41M 3/14* (2013.01); *B42D 15/00* (2013.01); *B42D 25/29* (2014.10); *B42D 25/45* (2014.10); *G02B 5/3041* (2013.01); *B41M 3/148* (2013.01); *B42D 2033/26* (2013.01); *B42D 2035/36* (2013.01)

(58) Field of Classification Search
CPC .... B42D 15/00; B42D 25/29; B42D 2033/26; B42D 2035/36; B41M 3/14; G02B 5/3041
USPC ........................ 283/72, 90, 94, 98, 109, 901
See application file for complete search history.

(56) References Cited

U.S. PATENT DOCUMENTS

| | | | |
|---|---|---|---|
| 2003/0035191 A1* | 2/2003 | Moia | G06K 19/06046 359/281 |
| 2010/0109317 A1* | 5/2010 | Hoffmuller | B41M 3/14 283/91 |

FOREIGN PATENT DOCUMENTS

| | | |
|---|---|---|
| JP | 2001-525080 | 12/2001 |
| JP | 2005-326882 | 11/2005 |
| JP | 2009-73103 | 4/2009 |

(Continued)

OTHER PUBLICATIONS

International Search Report dated May 29, 2012 in corresponding International Application No. PCT/JP2012/054785.

(Continued)

*Primary Examiner* — Justin V Lewis

(57) ABSTRACT

An anti-counterfeit medium includes a portion having optical transparency, a retardation layer facing the portion and including regions whose slow axis directions are different from each other, and a polarizing layer facing the retardation layer at a position of the portion. The anti-counterfeit medium includes only the polarizing layer as a polarizer. A portion out of the anti-counterfeit medium where the portion, the retardation layer, and the polarizing layer form a stacked structure has optical transparency.

9 Claims, 4 Drawing Sheets

(51) Int. Cl.
   *B42D 15/00*   (2006.01)
   *B42D 25/29*   (2014.01)

(56) References Cited

FOREIGN PATENT DOCUMENTS

JP    2010-280079    12/2010
WO    WO 98/52077    11/1998

OTHER PUBLICATIONS

International Preliminary Report on Patentability dated Sep. 12, 2013 in corresponding International Patent Application No. PCT/JP2012/054785.

* cited by examiner

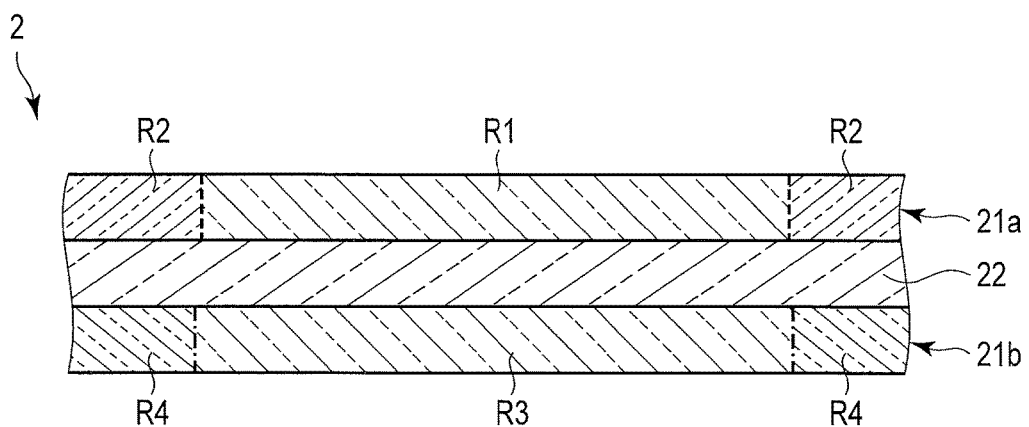
F I G. 5
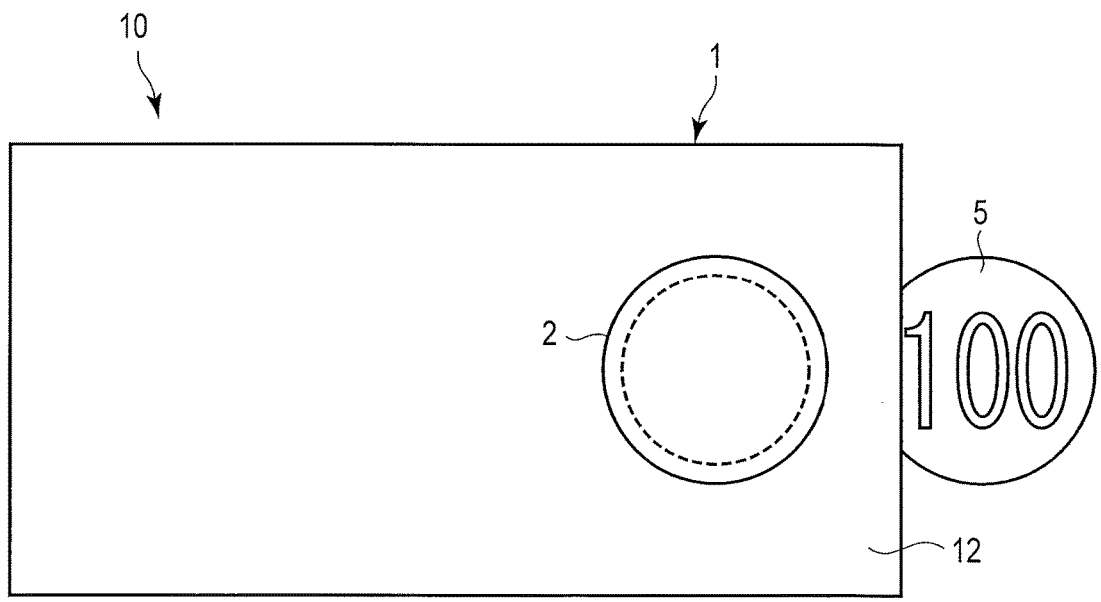
F I G. 6

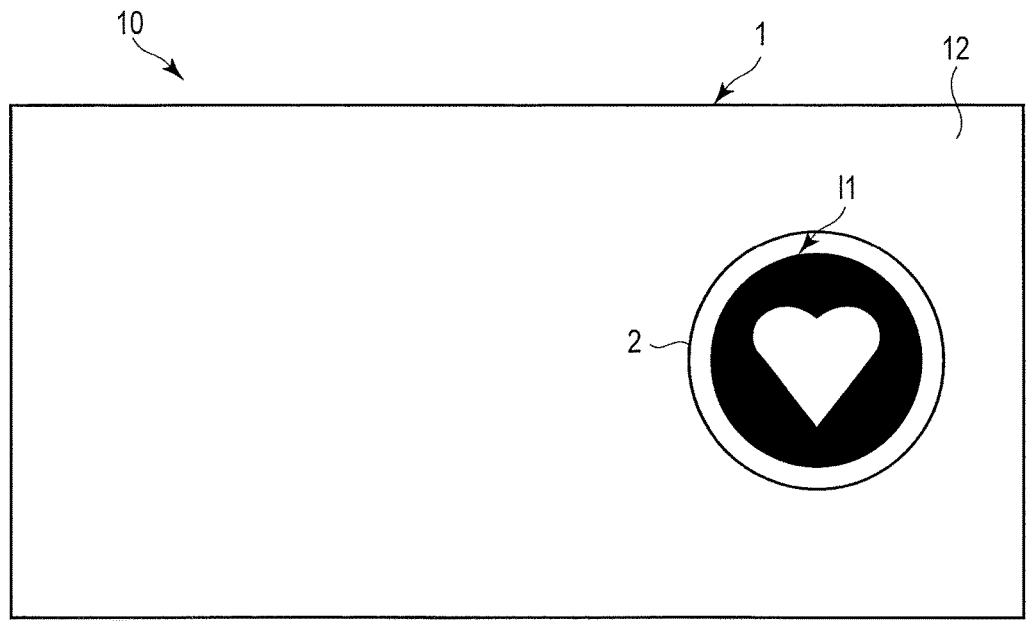
F I G. 7
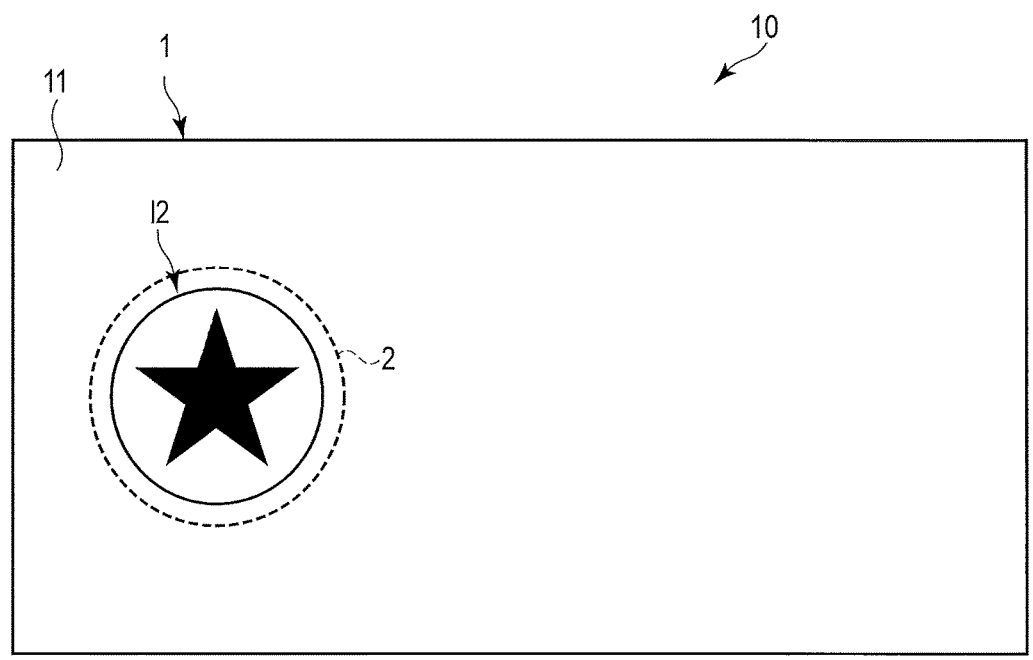
F I G. 8

ANTI-COUNTERFEIT MEDIUM AND VERIFICATION METHOD

CROSS REFERENCE TO RELATED APPLICATIONS

This application is a Continuation Application of PCT Application No. PCT/JP2012/054785, filed Feb. 27, 2012 and based upon and claiming the benefit of priority from prior Japanese Patent Application No. 2011-041609, filed Feb. 28, 2011, the entire contents of all of which are incorporated herein by reference.

BACKGROUND OF THE INVENTION

1. Field of the Invention

The present invention relates to an anti-counterfeit medium and a verification method.

2. Description of the Related Art

Media used as securities such as banknotes and merchandise coupons or certificates such as passports conventionally utilize a device difficult to counterfeit (to be referred to as an anti-counterfeit device hereinafter) for the purpose of preventing counterfeit. Anti-counterfeit technologies include an overt technology and a covert technology. In the overt technology, authenticity is determined by observation with the unaided eye. On the other hand, in the covert technology, authenticity is determined using a verification tool.

The overt technology has the advantage of obviating the need for a verification tool for authenticity determination. Simultaneously, the overt technology is disadvantageous because it is easy to notice the anti-counterfeit technology employed in the anti-counterfeit device.

Some of the recent anti-counterfeit devices use a latent image to be visualized upon observation through a polarizer to prevent counterfeit. For example, Jpn. Pat. Appln. KOKAI Publication No. 2005-326882 describes using a device including a reflecting layer and a birefringent layer formed by cross-linking a liquid crystal monomer to prevent counterfeit of banknotes. In this anti-counterfeit device, the birefringent layer includes two regions whose slow axis directions differ by 45°. These regions form latent images that cannot be discriminated from each other upon observation by the unaided eye and are visualized by observing reflected light through a polarizer.

In this technique, a polarizer is used as a verification tool. In the anti-counterfeit technology using a verification tool, for example, the above-described anti-counterfeit label is pasted on each authentic tradable coupon or ticket. The retailer or service company prepares the verification tool in advance. This allows the retailer or service company to determine the authenticity of tradable coupons or tickets received from general consumers using the verification tool.

However, the general consumers normally have no verification tool. Hence, in the above-described technique, the general consumers can hardly determine the authenticity by themselves.

Jpn. PCT National Publication No. 2001-525080 describes a medium in which a flexible support member having optical transparency supports both an anti-counterfeit device and a verification tool.

In this medium, the anti-counterfeit device includes a birefringent layer facing a part of the support member, and a linear polarizer serving as a first polarizer intervening between them. The birefringent layer is formed by cross-linking a liquid crystal monomer, and includes two regions whose slow axis directions differ by 45°. These regions form latent images that cannot be discriminated from each other upon observation by the unaided eye.

In this medium, the verification tool is a second polarizer facing a part of the support member. When the support member is bent to make the birefringent layer intervene between the first polarizer and the second polarizer, and transmitted light is observed in this state, the latent images are visualized.

BRIEF SUMMARY OF THE INVENTION

The present inventors have found that authenticity determination is easy in the medium including both the anti-counterfeit device and the verification tool, but the cost for manufacturing such a device is difficult to reduce. It is therefore an object of the present invention to provide an anti-counterfeit medium capable of easily determining authenticity and easily reducing the manufacturing cost.

According to a first aspect of the present invention, there is provided an anti-counterfeit medium comprising a support member including a first portion having optical transparency, a first retardation layer facing the first portion and including a plurality of regions whose slow axis directions are different from each other, and a polarizing layer facing the first retardation layer at a position of the first portion, wherein the anti-counterfeit medium comprises only the polarizing layer as a polarizer, and a portion out of the anti-counterfeit medium where the first portion, the first retardation layer, and the polarizing layer form a stacked structure has optical transparency.

According to a second aspect of the present invention, there is provided the anti-counterfeit medium according to the first aspect, wherein the polarizing layer is a linear polarizer.

According to a third aspect of the present invention, there is provided the anti-counterfeit medium according to the second aspect, wherein at least one of the plurality of regions of the first retardation layer has the slow axis direction parallel or perpendicular to a transmission axis of the polarizing layer.

According to a fourth aspect of the present invention, there is provided the anti-counterfeit medium according to any one of the first to third aspects, wherein at least one of the plurality of regions of the first retardation layer serves as a quarter-wave plate for light having a specific wavelength in a visible range.

According to a fifth aspect of the present invention, there is provided the anti-counterfeit medium according to any one of the first to fourth aspects, wherein the first retardation layer is formed by solidifying a liquid crystal material exhibiting a nematic phase.

According to a sixth aspect of the present invention, there is provided the anti-counterfeit medium according to any one of the first to fifth aspects, further comprising a second retardation layer facing the first retardation layer with the polarizing layer interposed therebetween, the second retardation layer including a plurality of regions whose slow axis directions are different from each other.

According to a seventh aspect of the present invention, there is provided the anti-counterfeit medium according to any one of the first to sixth aspects, wherein the support member has flexibility.

According to an eighth aspect of the present invention, there is provided the anti-counterfeit medium according to any one of the first to seventh aspects, wherein the support member further includes a second portion having light-shielding properties.

According to a ninth aspect of the present invention, there is provided the anti-counterfeit medium according to the eighth aspect, wherein the support member includes a transparent substrate, and a cover layer covering the transparent substrate and having an opening at a position corresponding to the first portion.

According to a tenth aspect of the present invention, there is provided a method of verifying that the anti-counterfeit medium of the first aspect is authentic, comprising observing a portion of the anti-counterfeit medium corresponding to the stacked structure with a unaided eye in a state in which the first retardation layer is located between the polarizing layer and an observer, and a reflector is located behind the anti-counterfeit medium.

BRIEF DESCRIPTION OF THE SEVERAL VIEWS OF THE DRAWING

FIG. 5 is a sectional view taken along a line V-V of the anti-counterfeit device shown in FIG. 3;

FIG. 6 is a plan view schematically showing an image displayed by the anti-counterfeit device when observing the anti-counterfeit medium from the obverse side with the unaided eye in a first state in which no reflector exists behind the anti-counterfeit medium shown in FIG. 1;

FIG. 7 is a plan view schematically showing an image displayed by the anti-counterfeit device when observing the anti-counterfeit medium from the obverse side with the unaided eye in a second state in which a reflector exists behind the anti-counterfeit medium shown in FIG. 1; and FIG. 8 is a plan view schematically showing an image displayed by the anti-counterfeit device when observing the anti-counterfeit medium from the reverse side with the unaided eye in the second state in which a reflector exists behind the anti-counterfeit medium shown in FIG. 1.

DETAILED DESCRIPTION OF THE INVENTION

Figure 1:
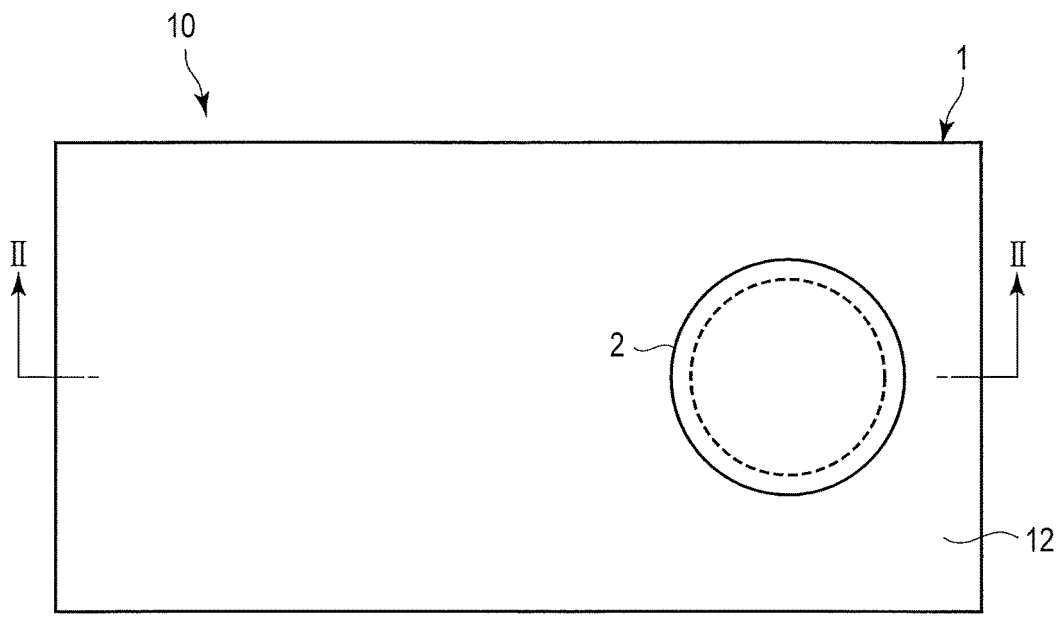
FIG. 1 is a plan view schematically showing an anti-counterfeit medium according to an embodiment of the present invention.

An embodiment of the present invention will now be described. Note that the same reference numerals denote constituent elements exerting the same or similar functions throughout the drawings, and a repetitive description thereof will be omitted. In the following explanation, terms associated with light are used for light in the visible range unless specifically stated otherwise.

Figure 2:
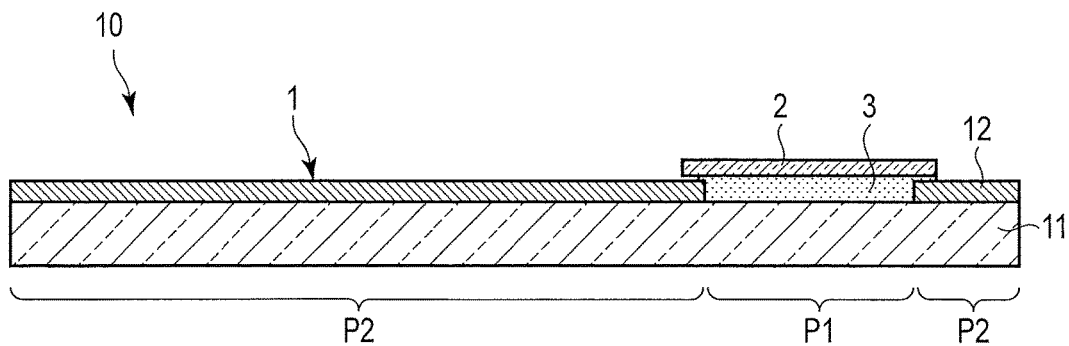
FIG. 2 is a sectional view taken along a line II-II of the anti-counterfeit medium shown in FIG. 1.

FIG. 1 is a plan view schematically showing an anti-counterfeit medium according to an embodiment of the present invention. FIG. 2 is a sectional view taken along a line II-II of the anti-counterfeit medium shown in FIG. 1.

The anti-counterfeit medium 1 shown in FIGS. 1 and 2 is a paper currency such as a banknote. The anti-counterfeit medium 1 may be another security such as a merchandise coupon. Alternatively, the anti-counterfeit medium 1 may be a certificate such as passport.

The anti-counterfeit medium 1 includes a support member 1, an anti-counterfeit device 2, and an adhesive layer 3.

The support member 1 has a film- or sheet-like shape here. The support member 1 includes a first portion P1 having optical transparency and a second portion P2 having light-shielding properties. The first portion P1 and the second portion P2 are adjacent to each other in a direction parallel to the major surface of the support member 1. The first portion P1 has a circular shape, and the second portion P2 surrounds the first portion P1. The first portion P1 may have a shape other than a circular shape, and the second portion P2 need not always surround the first portion P1. The support member 1 may include two or more first portions P1 and two or more second portions P2.

The support member 1 includes a transparent substrate 11 and a cover layer 12.

The transparent substrate 11 has a film- or sheet-like shape here. As the transparent substrate 11, for example, a nonoriented film or an oriented film manufactured by extrusion molding or casting is usable. The oriented film can be either a uniaxially oriented film or a biaxially oriented film.

Examples of the material of the nonoriented film and the oriented film are cellophane, polycarbonate (PC), polyethylene (PE), polypropylene (PP), polyolefine (PO), ethylene-vinylalcohol (EVOH), polyvinyl alcohol (PVA), polyvinyl chloride, polyethylene naphthalate (PEN), polyethylene terephthalate (PET), nylon, acrylic resin, and cellulose triacetate (TAC).

The cover layer 12 covers one major surface of the transparent substrate 11. The cover layer 12 has an opening at a position corresponding to the first portion P1. The first portion P1 is a portion corresponding to the opening portion of the cover layer 12 out of the support member 1. The second portion P2 is a portion corresponding to the cover layer 12 out of the support member 1.

The cover layer 12 makes, for example, the transmittance or transparency of the second portion P2 lower than the transmittance or transparency of the first portion P1. Typically, a print pattern is provided on the second portion P2. When, for example, different print patterns are provided on the obverse surface and the reverse surface of the second portion P2, the cover layer 12 prevents one print pattern from lowering the visibility of the other print pattern. The cover layer 12 is, for example, a light-shielding layer.

As the material of the cover layer 12, for example, normal printing ink is usable. In this case, the cover layer 12 can be formed by a known method such as silk screen printing, offset printing, or gravure printing.

As the support member 1, a paper sheet or a complex of a paper sheet and a resin film may be used. For example, a paper sheet having an opening portion may be used as the support member 1. Alternatively, a complex formed by bonding a paper sheet having an opening portion may be used as the support member 1.

The anti-counterfeit device 2 faces the support member 1 at the position of the first portion P1. The anti-counterfeit device 2 has, for example, a film- or sheet-like shape. The anti-counterfeit device 2 has optical transparency. For example, the anti-counterfeit device 2 is at least partially transparent. The anti-counterfeit device 2 will be described later in detail.

The adhesive layer 3 intervenes between the support member 1 and the anti-counterfeit device 2. The adhesive layer 3 bonds the anti-counterfeit device 2 to the support member 1.

The adhesive layer 3 has optical transparency. Typically, the adhesive layer 3 is transparent. As the material of the adhesive layer 3, for example, an adhesive based on a vinyl chloride-vinyl acetate copolymer, polyester, polyamide, or the like, or a sticker based on acryl, butyl rubber, natural rubber, silicone, polyisobutyl, or the like can be used solely or together with a coagulation component such as alkylmethacrylate, vinylester, acrylonitrile, styrene, or vinyl monomer and an additive such as a modifier, a polymerization initiator, a plasticizer, a hardening agent, an accelerator, or an antioxidant represented by an unsaturated carboxylic acid, a monomer containing a hydroxy group, and acrylonitrile.

The adhesive layer 3 can be formed by a known printing method such as gravure printing, offset printing, or silk screen printing, or a coating method such as bar coating, gravure coating, or roll coating. The adhesive layer 3 may be provided using a sticky layer with a film separator on each surface. The support member 1 and the anti-counterfeit device 2 can be bonded using a known method such as roll laminating or thermal transfer.

The anti-counterfeit device 2 will be described next in more detail.

Figure 3:
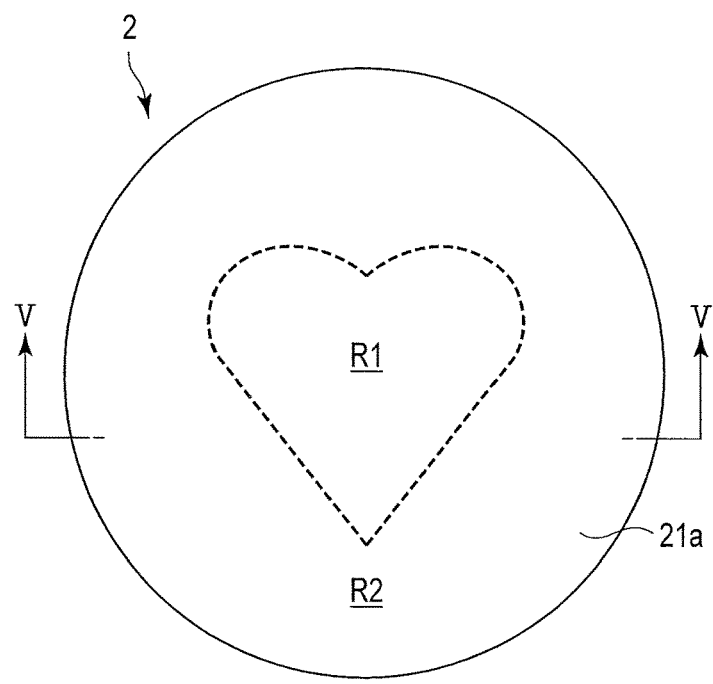
FIG. 3 is a plan view schematically showing the reverse surface of the anti-counterfeit device included in the anti-counterfeit medium shown in FIG. 1.
Figure 4:
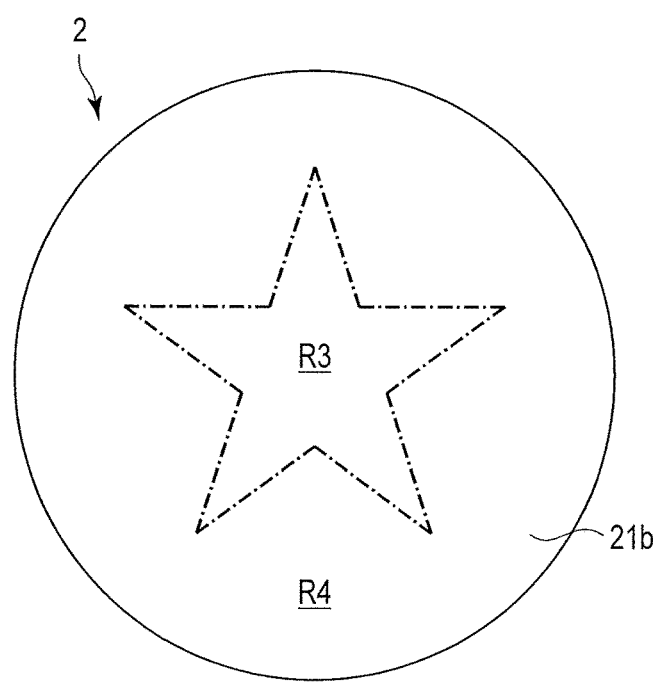
FIG. 4 is a plan view schematically showing the obverse surface of the anti-counterfeit device shown in FIG. 3.

FIG. 3 is a plan view schematically showing the reverse surface of the anti-counterfeit device included in the anti-counterfeit medium shown in FIG. 1. FIG. 4 is a plan view schematically showing the obverse surface of the anti-counterfeit device shown in FIG. 3. FIG. 5 is a sectional view taken along a line V-V of the anti-counterfeit device shown in FIG. 3.

The anti-counterfeit device 2 shown in FIGS. 3, 4, and 5 includes retardation layers 21a and 21b and a polarizing layer 22. The polarizing layer 22 intervenes between the retardation layers 21a and 21b. The anti-counterfeit device 2 is supported by the support member 1 such that the retardation layer 21a faces the first portion P1. Note that one of the retardation layers 21a and 21b can be omitted.

The retardation layer 21a is made of an optically anisotropic material, more specifically, a material that exhibits birefringence. "Birefringence" is a phenomenon in which light that has entered a medium having optical anisotropy generates two refracted light components with different speeds.

The retardation layer 21a includes regions R1 and R2 having different slow axis (or optical axis) directions. The regions R1 and R2 are adjacent to each other in a direction perpendicular to the thickness direction of the retardation layer 21a. The regions R1 and R2 form latent images that cannot or can hardly be discriminated from each other under a normal condition and are visualized under a specific condition.

As shown in FIG. 3, the region R1 has a heart shape, and the region R2 surrounds the region R1. The regions R1 and R2 may have other shapes. In this case, the retardation layer 21a includes the regions R1 and R2 having different slow axis directions. However, the retardation layer 21a may further include one or more regions whose slow axis directions are different from those of the regions R1 and R2.

Typically, each of the regions R1 and R2 has an optical axis almost parallel to its major surface. The refractive index in a direction parallel to the optical axis and the refractive index in a direction perpendicular to the optical axis are different. For this reason, for example, when light perpendicularly enters the region R1 or R2, a linearly polarized light component having an electric field vector oscillation direction parallel to the optical axis and a linearly polarized light component having an electric field vector oscillation direction parallel to the optical axis propagate at different speeds, and a phase difference corresponding to the thickness of the region R1 or R2 and the refractive index difference is generated between them.

Each of the regions R1 and R2 generates an arbitrary phase difference between the linearly polarized light having an electric field vector oscillation direction parallel to the optical axis and the linearly polarized light having an electric field vector oscillation direction perpendicular to the optical axis. Typically, the phase difference generated by the region R1 between the linearly polarized light components equals the phase difference generated by the region R2 between the linearly polarized light components. The phase difference generated by the region R1 between the linearly polarized light components may be different from the phase difference generated by the region R2 between the linearly polarized light components.

The retardation layer 21a can be formed by, for example, applying a liquid crystal material on an alignment film and solidifying the coating. When alignment films that have undergone different alignment processes in correspondence with the regions R1 and R2 are used, the regions R1 and R2 having different slow axis directions are obtained.

The alignment film and the retardation layer 21a may sequentially be formed on the polarizing layer 22. An adhesive layer, the alignment film, and the retardation layer 21a may sequentially be formed on the polarizing layer 22. Alternatively, the alignment film and the retardation layer 21a may sequentially be formed on a substrate prepared separately, and the retardation layer 21a may be transferred from the substrate onto the polarizing layer 22, or the retardation layer 21a peeled off the substrate may be bonded to the polarizing layer 22.

The alignment film is made of, for example, polyimide or polyvinyl alcohol (PVA). The alignment film is obtained by, for example, forming a coating using a known method such as gravure coating or microgravure coating and performing an alignment process for the coating.

As the alignment process, for example, a rubbing process or a photo alignment process is usable.

When using the rubbing process, first, a coating made of a solution containing a polymer of polyimide, PVA, or the like is formed. The coating is dried, and the surface of the coating is rubbed with a rubbing cloth. When a liquid crystal material is applied to the thus obtained alignment film, the liquid crystal molecules align in the rubbing direction.

In this case, the regions R1 and R2 having different slow axis directions are formed. To do this, the rubbing process is performed twice, as will be described below. First, a coating of a polymer is formed, and its surface is partially covered with a mask. In this state, the rubbing process is performed for a region uncovered with the mask out of the surface of the coating. Next, the mask is removed from the coating. The region that has undergone the rubbing process out of the surface of the coating is covered with a mask. The rubbing process is performed for the remaining region. After removal of the mask, a liquid crystal material is applied onto the thus obtained alignment film, and the coating is hardened. When the rubbing direction is changed between the first rubbing process and the second rubbing process, the regions R1 and R2 having different slow axis directions are obtained.

The photo alignment process uses, for example, photoisomerization of an azobenze derivative, photodimerization or photo crosslinking of a derivative of cinnamate, coumarin, chalcone, benzophenone, or the like, or photolysis of polyimide or the like. More specifically, first, a coating containing the above-described photosensitive material is formed. This coating is irradiated with linearly polarized light or obliquely irradiated with natural light. This induces anisotropic rearrangement or chemical reaction of molecules in the coating. When a liquid crystal material is applied onto the thus obtained alignment film, the liquid crystal molecules align in correspondence with the anisotropic alignment of the molecules in the alignment film.

In this case, the regions R1 and R2 having different slow axis directions are formed. To do this, the photo alignment process is performed as will be described below. First, a coating containing a photosensitive material is formed and partially exposed to linearly polarized light via a photo mask. Next, the remaining portion of the coating is exposed to linearly polarized light via the photo mask. After that, a liquid crystal material is applied onto the thus obtained alignment film, and the coating is hardened. When the electric field vector oscillation direction of the linearly polarized light component is changed between the first exposure and the second exposure, the regions R1 and R2 having different slow axis directions are obtained.

Alternatively, first, a coating containing a photosensitive material is formed and partially exposed to natural light in an oblique direction via a photo mask. Next, the remaining portion of the coating is exposed to natural light in an oblique direction via the photo mask. After that, a liquid crystal material is applied onto the thus obtained alignment film, and the coating is hardened. When the natural light irradiation direction is changed between the first exposure and the second exposure, the regions R1 and R2 having different slow axis directions are obtained.

Note that in both the method of irradiating coating with linearly polarized light and the method of irradiating coating with natural light, the first exposure may be done for the entire coating.

The retardation layer 21a is obtained from a thermotropic liquid crystal such as a smectic liquid crystal or a nematic liquid crystal. For example, a polymer liquid crystal material to be cured by an electron beam or UV irradiation is applied to the alignment film. As the polymer liquid crystal material, for example, a mixture containing a photopolymerization initiator and a main chain monomer containing a reactive functional group such as an acryl group at both ends of a mesogenic group, a mixture containing a photopolymerization initiator and a side chain monomer containing a polymeric functional group at one end of a mesogenic group, or a mixture containing a reactive polymer, a photopolymerization initiator, and a side chain monomer containing a reactive functional group at one end of a mesogenic group is usable. For this coating, for example, gravure coating or microgravure coating is usable. Next, the coating is irradiated with an electron beam or UV rays, thereby obtaining the retardation layer 21a made of a side chain or main chain polymer liquid crystal.

Before irradiation with the electron beam or UV rays, the coating may be heat-treated at a temperature slightly lower than the phase transition point (NI point) between the nematic phase and the isotropic phase. This can promote the alignment of the mesogenic group.

Note that there also exists an alignment film that exhibits birefringence. Such a layer may be used as the retardation layer 21a. In this case, the alignment film can be omitted.

The retardation layer 21b faces the retardation layer 21a via the polarizing layer 22. The retardation layer 21b is made of an optically anisotropic material, more specifically, a material that exhibits birefringence.

The retardation layer 21b includes regions R3 and R4 having different slow axis (or optical axis) directions. The regions R3 and R4 are adjacent to each other in a direction perpendicular to the thickness direction of the retardation layer 21b. The regions R3 and R4 form latent images that cannot or can hardly be discriminated from each other under a normal condition and are visualized under a specific condition.

As shown in FIG. 4, the region R3 has a star shape, and the region R4 surrounds the region R3. The regions R3 and R4 may have other shapes. In this case, the retardation layer 21b includes the regions R3 and R4 having different slow axis directions. However, the retardation layer 21b may further include one or more regions whose slow axis directions are different from those of the regions R3 and R4.

Note that typically, the pattern of the regions included in the retardation layer 21b is different from the pattern of the regions included in the retardation layer 21b. In this case, the anti-counterfeit device 2 can be caused to display different images in a case in which the anti-counterfeit medium 10 is observed from the obverse side and in a case in which the anti-counterfeit medium 10 is observed from the reverse side, as will be described later.

Typically, each of the regions R3 and R4 has an optical axis almost parallel to its major surface. The refractive index in a direction parallel to the optical axis and the refractive index in a direction perpendicular to the optical axis are different. For this reason, for example, when light perpendicularly enters the region R3 or R4, a linearly polarized light component having an electric field vector oscillation direction parallel to the optical axis and a linearly polarized light component having an electric field vector oscillation direction parallel to the optical axis propagate at different speeds, and a phase difference corresponding to the thickness of the region R3 or R4 and the refractive index difference is generated between them.

The angle made by the optical axis of the region R3 and the optical axis of the region R4 can be equal to or different from the angle made by the optical axis of the region R1 and the optical axis of the region R2. The optical axis of each of the regions R3 and R4 can be parallel, perpendicular, to oblique to the optical axis of at least one of the regions R1 and R2.

Each of the regions R3 and R4 generates an arbitrary phase difference between the linearly polarized light having an electric field vector oscillation direction parallel to the optical axis and the linearly polarized light having an electric field vector oscillation direction perpendicular to the optical axis. Typically, the phase difference generated by the region R3 between the linearly polarized light components equals the phase difference generated by the region R4 between the linearly polarized light components. The phase difference generated by the region R3 between the linearly polarized light components may be different from the phase difference generated by the region R4 between the linearly polarized light components.

The phase difference generated by the region R3 or R4 between the linearly polarized light components can be equal to or different from the phase difference generated by the region R1 or R2 between the linearly polarized light components. For example, each of the regions R1 to R4 can serve as a half-wave plate for light of the same wavelength, or each of the regions R1 to R4 can serve as a quarter-wave plate for light of the same wavelength. Alternatively, the regions R1 and R2 may serve as a half-wave plate for light of the same wavelength, and the regions R3 and R4 may serve as a quarter-wave plate for the light of the above-described wavelength. Otherwise, the regions R1 and R2 may serve as a quarter-wave plate for light of the same wavelength, and the regions R3 and R4 may serve as a half-wave plate for the light of the above-described wavelength.

The polarizing layer 22 intervenes between the retardation layers 21a and 21b. In this case, the polarizing layer 22 faces the first portion P1 via the retardation layer 21b.

The polarizing layer 22 is a linear polarizer, for example, an absorption-type linear polarizer. As the polarizing layer 22, for example, a polarizer obtained by impregnating iodine or a dichroic dye in a PVA film and orienting the film, or a polarizer obtained by making a dichroic dye align on an alignment film is usable.

An image displayed by the anti-counterfeit medium 10 will be described next.

FIG. 6 is a plan view schematically showing an image displayed by the anti-counterfeit device when observing the anti-counterfeit medium from the obverse side with the unaided eye in a first state in which no reflector exists behind the anti-counterfeit medium shown in FIG. 1. FIG. 7 is a plan view schematically showing an image displayed by the anti-counterfeit device when observing the anti-counterfeit medium from the obverse side with the unaided eye in a second state in which a reflector exists behind the anti-counterfeit medium shown in FIG. 1. FIG. 8 is a plan view schematically showing an image displayed by the anti-counterfeit device when observing the anti-counterfeit medium from the reverse side with the unaided eye in the second state in which a reflector exists behind the anti-counterfeit medium shown in FIG. 1.

Note that for the descriptive convenience, one of the two major surface of the anti-counterfeit medium 10 on which the anti-counterfeit device 2 is provided is defined as the obverse surface, and the other surface is defined as the reverse surface. The term "behind" is used to express the position of the reflector viewed from the observer.

The following structure will be assumed here as an example. Each of the regions R1 to R4 serves as a quarter-wavelength plate for a specific wavelength in the visible range. The polarizing layer 22 is an absorption-type linear polarizer. The slow axes of the regions R1 and R4 are parallel or perpendicular to the transmission axis of the polarizing layer 22. The slow axes of the regions R2 and R3 make an angle of 45° with respect to the transmission axis of the polarizing layer 22.

As shown in FIG. 6, when the anti-counterfeit medium 10 is observed from the obverse side with the unaided eye in the first state in which a reflector, in this case, a coin 5 does not exist behind the anti-counterfeit medium 10, more particularly, behind a portion corresponding to the first portion P1 of the anti-counterfeit medium 10, it is impossible or difficult to discriminate the regions R1 and R2 from each other, and it is also impossible or difficult to discriminate the regions R3 and R4 from each other. Hence, in this case, the anti-counterfeit device 2 looks like a transparent layer. In this state, even when the anti-counterfeit medium 10 is turned, the anti-counterfeit device 2 looks like a transparent layer.

As shown in FIG. 7, when the anti-counterfeit medium 10 is observed from the obverse side with the unaided eye in the second state in which the coin 5 exists behind the anti-counterfeit medium 10, natural light that has entered the anti-counterfeit device 2 from the obverse side passes through the retardation layer 21b and the polarizing layer 22 and is thus converted into linearly polarized light.

Out of the linearly polarized light, a component that has entered the region R1 exits from the region R1 as linearly polarized light. This linearly polarized light is reflected by the coin 5, and after that, passes through the retardation layer 21a, the polarizing layer 22, and the retardation layer 21b and reaches the observer.

On the other hand, out of the linearly polarized light that has exited from the polarizing layer 22, a component that has entered the region R2 exits from the region R2 as right- or left-handed circularly polarized light. This right- or left-handed circularly polarized light is reflected by the coin 5 and thus converted into left- or right-handed circularly polarized light. This left- or right-handed circularly polarized light passes through the region R2 and is thus converted into linearly polarized light having an electric field vector oscillation direction perpendicular to the transmission axis of the polarizing layer 22. For this reason, the linearly polarized light is absorbed by the polarizing layer 22 and does not reach the observer.

Hence, out of the anti-counterfeit device 2, the portion corresponding to the region R1 looks bright, and the portion corresponding to the region R2 looks dark. That is, the anti-counterfeit medium 10 displays an image I1 shown in FIG. 7 at the position of the anti-counterfeit device 2.

As shown in FIG. 8, when the anti-counterfeit medium 10 is observed from the reverse side with the unaided eye in the second state in which the coin 5 exists behind the anti-counterfeit medium 10, natural light that has entered the anti-counterfeit device 2 from the reverse side passes through the retardation layer 21a and the polarizing layer 22 and is thus converted into linearly polarized light.

Out of the linearly polarized light, a component that has entered the region R4 exits from the region R4 as linearly polarized light. This linearly polarized light is reflected by the coin 5, and after that, passes through the retardation layer 21b, the polarizing layer 22, and the retardation layer 21a and reaches the observer.

On the other hand, out of the linearly polarized light that has exited from the polarizing layer 22, a component that has entered the region R3 exits from the region R3 as right- or left-handed circularly polarized light. This right- or left-handed circularly polarized light is reflected by the coin 5 and thus converted into left- or right-handed circularly polarized light. This left- or right-handed circularly polarized light passes through the region R3 and is thus converted into linearly polarized light having an electric field vector oscillation direction perpendicular to the transmission axis of the polarizing layer 22. For this reason, the linearly polarized light is absorbed by the polarizing layer 22 and does not reach the observer.

Hence, out of the anti-counterfeit device 2, the portion corresponding to the region R4 looks bright, and the portion corresponding to the region R3 looks dark. That is, the anti-counterfeit medium 10 displays an image I2 shown in FIG. 8 at the position of the anti-counterfeit device 2.

As described above, the anti-counterfeit medium 10 displays the different images I1 and I2 in the second state. In the first state, the images I1 and I2 cannot be observed. It is difficult to notice that the reflector is necessary to visualize the latent images. That is, it is difficult to notice the anti-counterfeit technology employed by the anti-counterfeit medium 10. In addition, a person who knows that the reflector is necessary to visualize the latent images can easily determine authenticity using the image I1 and/or the image I2.

The authenticity determination can be done using, for example, an article of daily use as a verification tool. That is, a special verification tool is unnecessary in this anti-counterfeit technology. It is therefore possible to reduce the cost of the verification tool and the burden in the manufacturing.

In addition, since no special verification tool is needed in authenticity determination, various persons can conduct the authenticity determination. For example, if the authenticity determination method has become widespread, an end consumer can conduct the authenticity determination.

Note that the anti-counterfeit medium 10 may display the image I1 and/or the image I2 without the reflector.

For example, some liquid crystal displays output linearly polarized light or elliptically polarized light as display light. When the anti-counterfeit medium 10 is located between the observer and such a liquid crystal display, the anti-counterfeit medium 10 displays the image I1 or I2 at the position of the anti-counterfeit device 2.

Polarized light exists even in the nature. For example, natural light may change to elliptically polarized light when reflected by a water surface or a plastic surface. If it is known that such light is polarized light, the anti-counterfeit medium 10 can be caused to display the image I1 or I2 using the polarized light.

For a specific application purpose, however, the situation in which the anti-counterfeit medium 10 displays the image I1 or I2 under various environments is not preferable. To prevent the image I1 or I2 from being displayed under a normal environment, a light scattering layer may be provided on at least one of the retardation layers 21a and 21b. The light scattering layer may be provided to face the polarizing layer 22 via the retardation layer 21a. Alternatively, the light scattering layer may be provided to face the polarizing layer 22 via the retardation layer 21b. Otherwise, a first light scattering layer may be provided to face the polarizing layer 22 via the retardation layer 21a, and a second light scattering layer may be provided to face the polarizing layer 22 via the retardation layer 21b.

The light scattering layer is, for example, an optically transparent layer having a fine three-dimensional structure on the surface. This light scattering layer is obtained from, for example, a mixture of an optically transparent resin and a filler. The light scattering layer is formed to generate a three-dimensional pattern whose arithmetic average roughness Ra defined in JIS B 0601-2001 is about 2 μm. The light scattering layer having this structure is provided on, for example, the retardation layer 21b.

As the light scattering layer, a layer whose light scattering capability is generated by internal scattering may be used. This light scattering layer is obtained from, for example, a mixture of an optically transparent resin and a filler having a refractive index different from the optically transparent resin. The light scattering layer having this structure is provided on, for example, the retardation layer 21a and/or 21b.

To use internal scattering, the refractive index difference Δn between the filler and the optically transparent resin preferably meets $0.03 \leq \Delta n \leq 0.3$. If the refractive index difference is small, an enormous amount of filler is necessary to obtain the effect of internal scattering, and the light scattering layer may become brittle. If the refractive index difference is large, the amount of filler needs to be small to attain an appropriate light scattering capability, and it may be impossible to obtain uniform internal scattering.

An average grain size d of the filler meets, for example, $0.01 \mu m \leq d \leq 5 \mu m$. If the average grain size d is small, it may be difficult to uniformly disperse the filler. If the average grain size d is large, the effect of the internal scattering layer may weaken.

A haze value Hz of the light scattering layer meets, for example, $2 < Hz < 10$. In this case, it is possible to prevent the latent images from being visualized by polarized light generated under a normal environment.

The light scattering layer can serve as a protective layer. Alternatively, a protective layer may be provided on the anti-counterfeit medium 10 and made to serve as the light scattering layer. The adhesive layer 3 may be made to serve as the light scattering layer.

As the optically transparent resin, for example, an acrylic resin, epoxy resin, polyester resin, or urethane resin; a copolymer thereof such as acrylic silicone resin; a material obtained by adding a hardening agent such as isocyanate or epoxide to the resins to strengthen them; or a compound containing a (meth)acryloyl group in molecules, and particularly, a compound containing one to 20 (meth)acryloyl groups is usable. A detailed example is a mixture containing a resin such as trimethylolpropane tri(meth)acrylate, pentaerythritol tri(meth)acrylate, pentaerythritol tetra(meth)acrylate, or dipentaerythritol hexa(meth)acrylate and a photo initiator that generates a radical when irradiated with activation energy lines such as UV rays. As the optically transparent resin, the materials described above concerning the adhesive layer 3 are also usable.

As the filler, for example, a filler made of a styrene resin, melamine resin, acrylic styrene resin, polycarbonate resin, or polyethylene resin is usable. As the filler, a filler made of an inorganic substance, for example, a clay mineral such as silica, titanium oxide, or talc may be used.

To form the light scattering layer, for example, a dispersion containing an optically transparent resin and a filler is obtained. When preparing the dispersion, a solvent is used as needed. Next, a coating of the above-described dispersion is formed using a printing method such as gravure printing, offset printing, or silk screen printing, or a coating method such as bar coating, gravure coating, or roll coating. The coating is dried. If the optically transparent resin needs radical polymerization, it is further irradiated with activation energy lines such as UV rays.

The surface of the anti-counterfeit medium 10 may be provided with a protective layer for the purpose of protecting the support member 1 and/or the anti-counterfeit device 2 from physical or chemical damage. As described above, this protective layer may serve as a light scattering layer.

The anti-counterfeit medium 10 is normally provided with a print pattern. In this case, the print pattern is provided not to impede visibility of the images I1 and I2.

The anti-counterfeit medium 10 may be provided with a relief-type diffraction structure, for example, a hologram and a diffraction grating. When this structure is employed, a higher anti-counterfeit effect can be achieved.

Note that although a structure in which the anti-counterfeit device 2 is bonded to the support member 1 has been described above, the above-described effect can also be obtained by employing another structure. For example, the anti-counterfeit device 2 may be formed from two components. One component may be supported by the obverse surface of the support member 11, and the other component may be supported by the reverse surface of the support member 11. That is, the retardation layer 21a and the polarizing layer 22 may face each other via the support member 11. Alternatively, the retardation layer 21b and the polarizing layer 22 may face each other via the support member 11.

An example of the present invention will be described below.

EXAMPLE

The anti-counterfeit medium 10 described with reference to FIGS. 1, 2, 3, 4, and 5 was manufactured by the following method.

First, a PVA-iodine film made by impregnating iodine in a PVA oriented film was prepared as the polarizing layer 22.

Next, a 10-wt % polyvinyl alcohol solution was applied to one major surface of the polarizing layer 22 using a bar coater such that the dried film thickness became 2 μm. PVA-117 available from Kuraray was used as the polyvinyl alcohol.

After drying the coating, a first mask having an opening in the same shape as the region R1 was placed on the coating. In this state, a rubbing process was performed for the coating. FINE PUFF YA-20-R available from Yoshikawa Chemical was used as the rubbing cloth. The rubbing direction matched the transmission axis of the polarizing layer 22.

After removing the first mask from the coating, a second mask having the same shape as the region R1 was placed on the coating such that the entire rubbed region was covered with the second mask. In this state, a rubbing process was performed for the coating. FINE PUFF YA-20-R available from Yoshikawa Chemical was used as the rubbing cloth. The angle made by the rubbing direction and the transmission axis of the polarizing layer 22 was 45°.

In the above-described way, an alignment film was formed on the polarizing layer 22.

Next, the following liquid crystal solution was gravure-printed on the alignment film. The thus obtained film was dried at 100° C. for 1 min. Subsequently, the dried film was irradiated with UV rays using a high-pressure mercury lamp at an irradiation energy of 500 mJ in a nitrogen atmosphere. With this process, the retardation layer 21a having a thickness of about 1 μm was obtained.

Liquid crystal 30 parts by mass (Paliocolor LC242 available from BASF)

Polymerization initiator 1.5 parts by mass (IRGACURE 184 available from Ciba Geigy)

Solvent 68.5 parts by mass (mixture containing toluene and methyl ethyl ketone in the same mass)

Next, a 10-wt % polyvinyl alcohol solution was applied to the other major surface of the polarizing layer 22 using a bar coater such that the dried film thickness became 2 μm. PVA-117 available from Kuraray was used as the polyvinyl alcohol.

After drying the coating, a third mask having the same shape as the region R3 was placed on the coating. In this state, a rubbing process was performed for the coating. FINE PUFF YA-20-R available from Yoshikawa Chemical was used as the rubbing cloth. The rubbing direction matched the transmission axis of the polarizing layer 22.

After removing the third mask from the coating, a fourth mask having an opening in the same shape as the region R3 was placed on the coating such that the entire rubbed region was covered with the fourth mask. In this state, a rubbing process was performed for the coating. FINE PUFF YA-20-R available from Yoshikawa Chemical was used as the rubbing cloth. The angle made by the rubbing direction and the transmission axis of the polarizing layer 22 was 45°.

In the above-described way, an alignment film was formed on the polarizing layer 22.

Next, the above-described liquid crystal solution was gravure-printed on the alignment film. The thus obtained film was dried at 100° C. for 1 min. Subsequently, the dried film was irradiated with UV rays using a high-pressure mercury lamp at an irradiation energy of 500 mJ in a nitrogen atmosphere. With this process, the retardation layer 21b having a thickness of about 1 μm was obtained.

The anti-counterfeit device 2 was thus completed.

Next, a TAC film having a thickness of 40 μm was prepared as the transparent substrate 11. Silk screen ink SS8-611 white available from Toyo Ink was screen-printed on one major surface of the transparent substrate 11, thereby forming the cover layer 12 having an opening corresponding to the anti-counterfeit device 2. The base 1 was thus obtained.

After that, the base 11 and the anti-counterfeit device 2 was bonded to each other via the adhesive layer 3. In the above-described way, the anti-counterfeit medium 10 was completed.

The anti-counterfeit medium 10 illuminated with natural light was observed with the unaided eye without locating a reflector behind it. As a result, the anti-counterfeit device 2 wholly looked transparent gray.

Next, the obverse surface of the anti-counterfeit medium 10 illuminated with natural light was observed with the unaided eye while locating the coin 5 behind it. As a result, the anti-counterfeit device 2 displayed the image I1 shown in FIG. 7.

In addition, the reverse surface of the anti-counterfeit medium 10 illuminated with natural light was observed with the unaided eye while locating the coin 5 behind it. As a result, the anti-counterfeit device 2 displayed the image I2 shown in FIG. 8.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An anti-counterfeit medium comprising:
  a support member including a first portion having optical transparency;
  a first retardation layer facing the first portion and including a plurality of regions whose slow axis directions are different from each other;
  a polarizing layer facing the first retardation layer at a position of the first portion; and
  a second retardation layer facing the first retardation layer with the polarizing layer interposed therebetween, the second retardation layer including a plurality of regions whose slow axis directions are different from each other, wherein
  the first retardation layer, the polarizing layer, and the second retardation layer are attached to the support member,
  the anti-counterfeit medium comprises only the polarizing layer as a polarizer,
  a portion out of the anti-counterfeit medium where the first portion, the first retardation layer, the polarizing layer, and the second retardation layer form a stacked structure has optical transparency, and
  the anti-counterfeit medium is configured such that
    the anti-counterfeit medium displays a first image when observing a portion of the anti-counterfeit medium corresponding to the stacked structure with an unaided eye in a state in which the first retardation layer is located between the polarizing layer and an observer, and a reflector is located behind the anti-counterfeit medium, and
    the anti-counterfeit medium displays a second image different from the first image when observing the portion of the anti-counterfeit medium corresponding to the stacked structure with the unaided eye in a state in which the second retardation layer is located between the polarizing layer and the observer, and the reflector is located behind the anti-counterfeit medium.

2. The anti-counterfeit medium according to claim 1, wherein the polarizing layer is a linear polarizer.

3. The anti-counterfeit medium according to claim 2, wherein at least one of the plurality of regions of the first retardation layer has the slow axis direction parallel or perpendicular to a transmission axis of the polarizing layer.

4. The anti-counterfeit medium according to claim 1, wherein at least one of the plurality of regions of the first retardation layer serves as a quarter-wave plate for light having a specific wavelength in a visible range.

5. The anti-counterfeit medium according to claim 1, wherein the first retardation layer is formed by solidifying a liquid crystal material exhibiting a nematic phase.

6. The anti-counterfeit medium according to claim 1, wherein the support member has flexibility.

7. The anti-counterfeit medium according to claim 1, wherein the support member further includes a second portion having light-shielding properties.

8. The anti-counterfeit medium according to claim 7, wherein the support member includes a transparent substrate, and a cover layer covering the transparent substrate and having an opening at a position corresponding to the first portion.

9. A method of verifying that the anti-counterfeit medium of claim 1 is authentic, comprising observing the portion of the anti-counterfeit medium corresponding to the stacked structure with an unaided eye in the state in which the first retardation layer is located between the polarizing layer and the observer, and the reflector is located behind the anti-counterfeit medium; and observing the portion of the anti-counterfeit medium corresponding to the stacked structure with the unaided eye in the state in which the second retardation layer is located between the polarizing layer and the observer, and the reflector is located behind the anti-counterfeit medium.

\* \* \* \* \*